(No Model.)

A. L. HOLLANDER.
DUST PAN.

No. 490,875. Patented Jan. 31, 1893.

Witnesses:
C. A. Young.
Walter S. McLeod.

Inventor:
A. L. Hollander
by
Wright, Brown & Crossley
Attys.

UNITED STATES PATENT OFFICE.

ALVA L. HOLLANDER, OF MILLIS, MASSACHUSETTS.

DUST-PAN.

SPECIFICATION forming part of Letters Patent No. 490,875, dated January 31, 1893.

Application filed August 22, 1892. Serial No. 443,733. (No model.)

*To all whom it may concern:*

Be it known that I, ALVA L. HOLLANDER, of Millis, in the county of Norfolk and State of Massachusetts, have invented certain new and useful Improvements in Dust-Pans, of which the following is a specification.

My invention relates to dust pans, and my object is to produce sheet-metal dust pans in which the handle shall be permanently and securely fastened to the pan without the use of solder.

My invention consists in the article of manufacture as hereinafter described and claimed.

Figure 1:
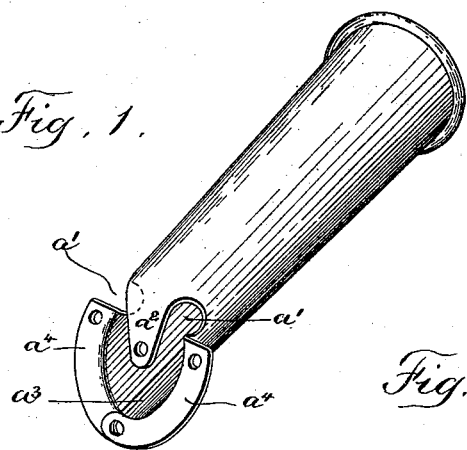
Figure 2:
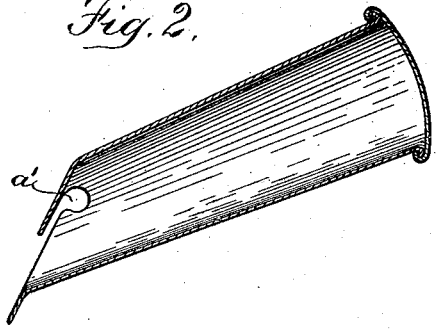
Figure 3:
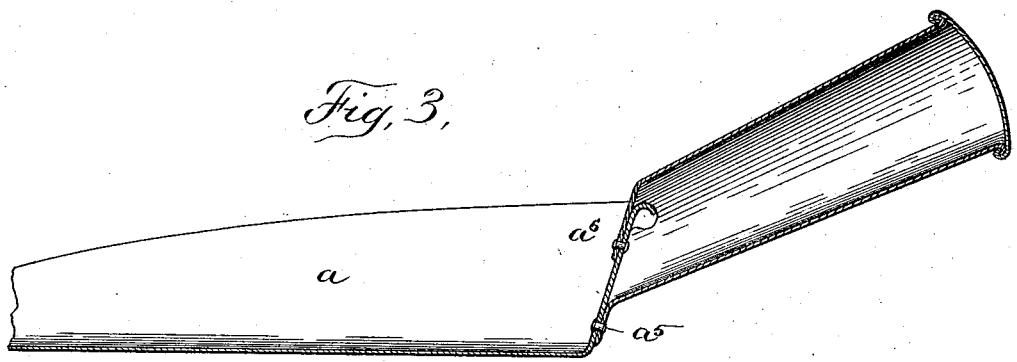

In the drawings which accompany and form part of this specification: Figure 1 is a perspective view of the handle. Fig. 2 is a longitudinal sectional view of the same. Fig. 3 is a longitudinal sectional view of the pan and handle, one end of the former being broken away.

The same letters of reference indicate the same parts in all the figures.

In the drawings: $a$ is the pan proper, which is of the usual form.

$b$ is the handle, made of sheet-metal rolled into tubular form and preferably slightly tapering toward the pan, at which end the metal of the handle is cut away to form openings as at $a'$ $a'$, and between the two cut-away portions $a'$ formed with a tongue $a^2$.

$a^3$, in Fig. 1, indicates the point where the metal is overlapped, and from this overlapping point the material is bent outwardly, each side, to form quadrantal flanges $a^4$ which extend from the overlapping point to the cut-away portions $a'$ and are in the same plane with each other. These flanges overlap each other, and at this point are provided with holes to receive a rivet $a^5$, and the flanges are also provided with other openings to receive other rivets by means of which the handle is permanently secured to the back of the pan $a$. The tongue $a^2$ is bent downwardly over and in front of the upper edge of the back of the pan, and is permanently secured to said back by a rivet $a^6$.

Ordinary sheet metal dust pans, which are placed in the market with a coating of japan and commonly called "black metal" dust pans, have their handles secured to the backs of the pans by means of solder. It is therefore necessary to tin the portions of the parts where they are to be soldered. By my invention, this expense is avoided, and the parts are firmly and permanently united.

It is to be noted that my improvement is applicable to scoops, frying pans, stove-shovels, &c., as well as to dust-pans.

I claim:

As an article of manufacture, a sheet metal dust pan having a handle composed of sheet metal rolled into tubular form and overlapped as at $a^3$, and having two curved cut away portions or openings $a'$ $a'$, the metal above and between said cut away portions being bent downward and riveted to the inside of the back part of the pan the upper edge of which enters the openings $a'$ $a'$, and the metal of the handle below the openings being bent outward to form two quadrantal flanges overlapping each other at their lower ends and riveted to the outside of the back of the pan, as set forth.

In testimony whereof I have signed my name to this specification, in the presence of two subscribing witnesses, this 13th day of August, A. D. 1892.

ALVA L. HOLLANDER.

Witnesses:
ARTHUR W. CROSSLEY,
WALTER S. MCLEOD.